United States Patent
Lin

(10) Patent No.: US 8,788,238 B2
(45) Date of Patent: Jul. 22, 2014

(54) SYSTEM AND METHOD FOR TESTING POWER SUPPLIES OF SERVER

(75) Inventor: Jui-Ching Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 385 days.

(21) Appl. No.: 13/221,855

(22) Filed: Aug. 30, 2011

(65) Prior Publication Data

US 2012/0226464 A1    Sep. 6, 2012

(30) Foreign Application Priority Data

Mar. 1, 2011    (TW) ............................. 100106694 A

(51) Int. Cl.
*G06F 1/16* (2006.01)
*G06F 1/26* (2006.01)

(52) U.S. Cl.
CPC ..................................... *G06F 1/263* (2013.01)
USPC ........................................... 702/119; 714/14

(58) Field of Classification Search
CPC ....................................................... G06F 1/263
USPC ............................................................ 702/119
See application file for complete search history.

(56) References Cited

U.S. PATENT DOCUMENTS 6,055,647 A * 4/2000 Lacombe et al. ................ 714/14
2009/0049337 A1 * 2/2009 Hsieh et al. ..................... 714/14

* cited by examiner

*Primary Examiner* — Bryan Bui
(74) *Attorney, Agent, or Firm* — Novak Druce Connolly Bove + Quigg LLP

(57) ABSTRACT

A computing system connects to a server that comprises a plurality of power supplies. The computing system sends a power on command to one or more alternating current (AC) relays which are connected to the power supplies. Each of the one or more AC relays powers on the corresponding power supply according to the power on command. The server starts if the all the power supplies are powered on. The computing system sends a power off command to each predefined AC relay to power off the power supply corresponding each predefined AC relay in sequence. An execution unit of the server tests application programs of the server when each power supply corresponding to the predefined AC relay has been powered off. A result of testing the server denotes if the server is abnormal when the power supply has been powered off.

10 Claims, 3 Drawing Sheets

SYSTEM AND METHOD FOR TESTING POWER SUPPLIES OF SERVER

BACKGROUND

1. Technical Field

Embodiments of the present disclosure generally relate to power supply management, and more particularly to a system and method for testing power supplies of a server.

2. Description of Related Art

A server may have a plurality of power supplies to ensure that the server is not powered down when one power supply is damaged. A commonly used method to test the reliability of the plurality of power supplies is often done by removing one power supply from the server and checking if the server can work normally without the removed power supply, and repeating the removing and checking operation until all the power supplies have been tested. If there are many power supplies, a lot of time may be consumed in testing the power supplies.

DETAILED DESCRIPTION

The application is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media may include CDs, DVDs, BLU-RAY, flash memory, and hard disk drives.

Figure 1:
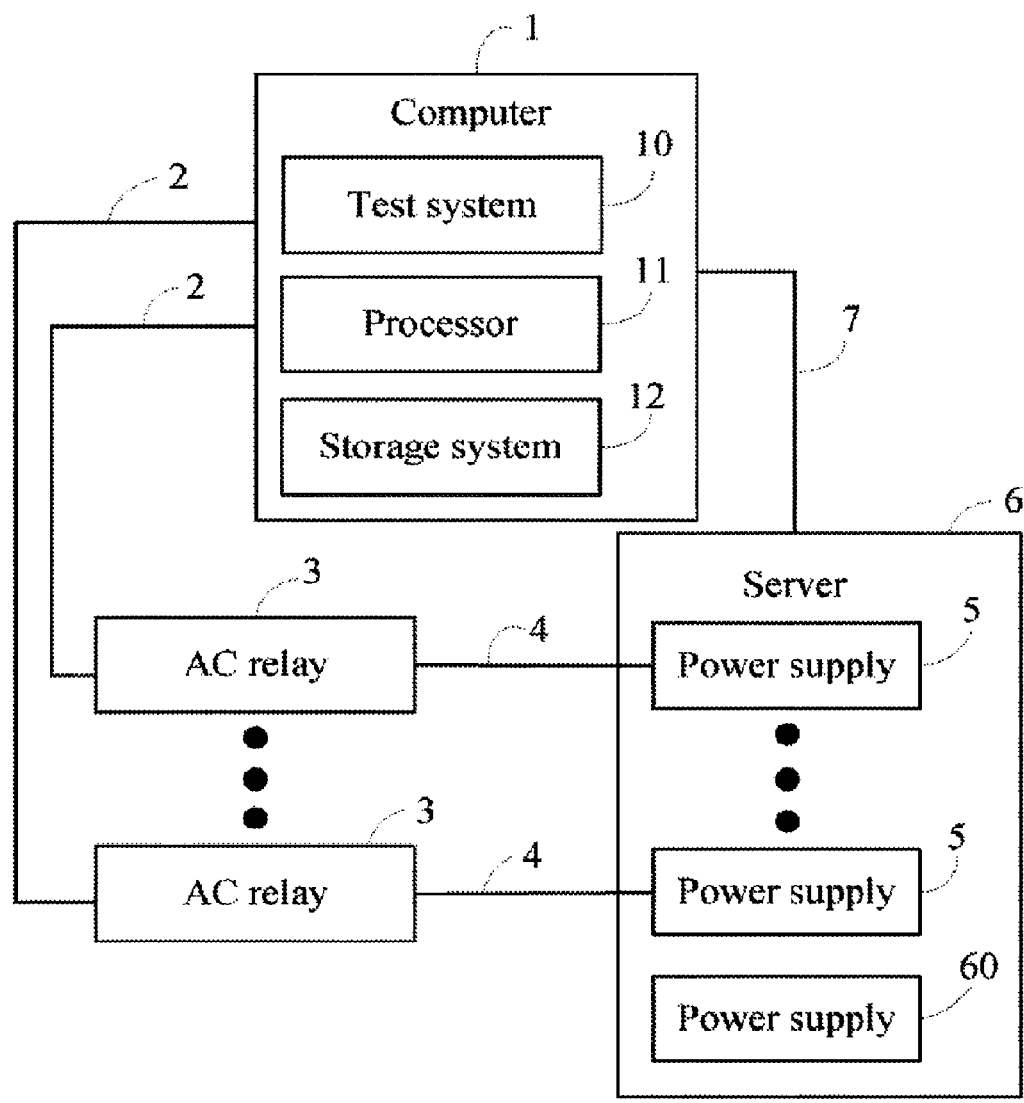
FIG. 1 is a block diagram of one embodiment of a computing system comprising a test system.

FIG. 1 is a block diagram of one embodiment of a computing system 1 comprising a test system 10. The computing system 1 connects to one or more alternating current (AC) relays 3 via control signal lines 2. The computing system 1 powers on or powers off the one or more AC relays 3. In one embodiment, each AC relay 3 may be allocated a serial number in order to be controlled by the computing system 1.

Each of the one or more AC relays 3 is connected between a standard power supply 5 to a server, via a power line 4, and may switch the power supply 5 on or off.

The server 6 is connected to the computing system 1 via a network 7. The server 6 includes an execution unit 60. The computing system 1 may send a test command to the server 6 via the network 7. The execution unit 60 tests the server 6 according to the test command and sends results of testing the server 6 ("the test result") to the computing system 1. The test result denotes if the server works normally. The server 6 includes a plurality of programs. The programs may be application programs or system programs. The execution unit 60 executes all the programs to detect if all the programs are executed normally. That all the programs are executed normally denotes that the server 6 works normally. In one embodiment, the execution unit 60 may test the capabilities of a CPU of the server 6 when the plurality of programs or one of them is executed.

In an exemplary embodiment, the computing system 1 includes at least one processor 11 and a storage system 12. The test system 10 may include one or more modules. The one or more modules may comprise computerized code in the form of one or more programs that are stored in the storage system 12 (or memory). In one embodiment, the storage system 12 may be a magnetic or an optical storage system, such as a hard disk drive, an optical drive, a compact disc, a digital video disc, a tape drive, or other suitable storage medium. The computerized code includes instructions that are executed by the at least one processor 11 to provide functions for the one or more modules.

Figure 2:
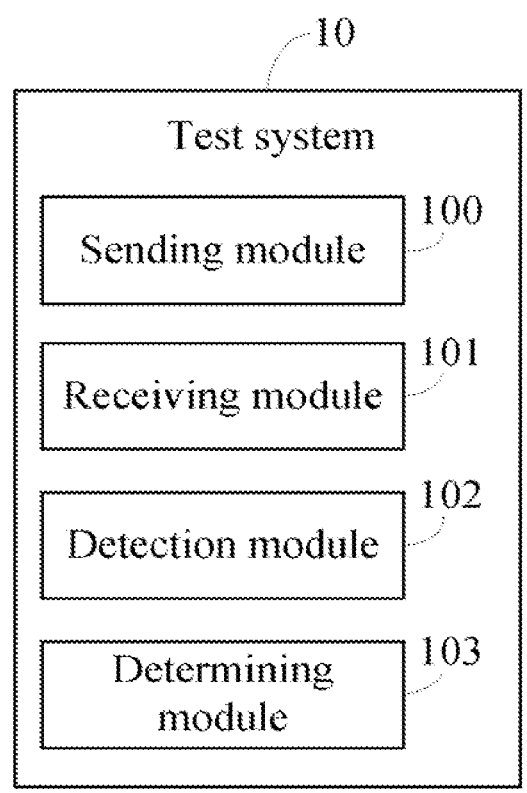
FIG. 2 is a block diagram of one embodiment of the function modules of the test system in FIG. 1.

As shown in FIG. 2, the test system 10 may include a sending module 100, a receiving module 101, a detection module 102, and a determining module 103.

The sending module 100 sends a power on command to each of the one or more AC relays 3 to power on the one or more AC relays 3. In one embodiment, if a serial number is allocated to each of the one or more AC relays 3, the sending module 100 sends the power on command to each of the one or more AC relays 3 in a sequence determined by the serial numbers.

The receiving module 101 receives state information from the server 6 according to a boot state of an operating system of the server 6. The boot state of the operating system is either in a completed state or an uncompleted state. In the completed state, components (e.g., software modules, drivers) of the operating system are initialized (e.g., ready) meaning that the server 6 is finished booting. If the uncompleted state, the components of the operating system are not initialized, such as when the server 6 is off or at least one component has not been initialized. The detection module 102 detects if the server 6 is booted according to the state information. If the server 6 is not booted (i.e., in the uncompleted state), the determining module 103 determines that the booting of the server 6 is abnormal.

If the server 6 is booted, the sending module 100 sends a power off command to a predefined AC relay 3. On receiving the power off command, the predefined AC relay 3 switches off the corresponding power supply 5.

When the power supply 5 of the predefined AC relay 3 is powered off, the sending module 100 sends a test command to the server 6 to execute the execution unit 60, and the execution unit 60 tests all the programs of the server 6 which is powered by remaining power supplies 5 which are not powered off.

The detection module 102 detects if a test time of the execution unit 60 has reached a predefined time. In one embodiment, the predefined time may be one hour. The test time is a time of how long the server 6 is tested.

If the test time has reached the predefined time, the receiving module 101 receives the test result from the server 6. If the elapsed time of the test has not reached the predefined time, the execution unit 60 continues testing the server 6.

The detection module 102 detects if the server 6 fails the test according to the test result. For example, if the test result is "0", the detection module 102 determines that the server 6 has failed the test, namely the server 6 works abnormally. If the test result is "1", the detection module 102 determines that the server 6 has completely passed the test, namely the server 6 works normally. If the server 6 fails the test, the determining module 103 stores the test result in the storage system 12. If the server 6 completely passes the test, the detection module 102 further detects if all the power supplies 5 are powered off by means of the AC relays 3. If any power supply 5 are been powered off, the sending module 100 sends the power off command to each AC relay 3 connected to the remaining power supplies 5 one by one until all the power supplies 5 have been powered off. If every one of the power supply 5 has been interrupted by the relays 3, the sending module 100 powers off the server 6.

Figure 3:
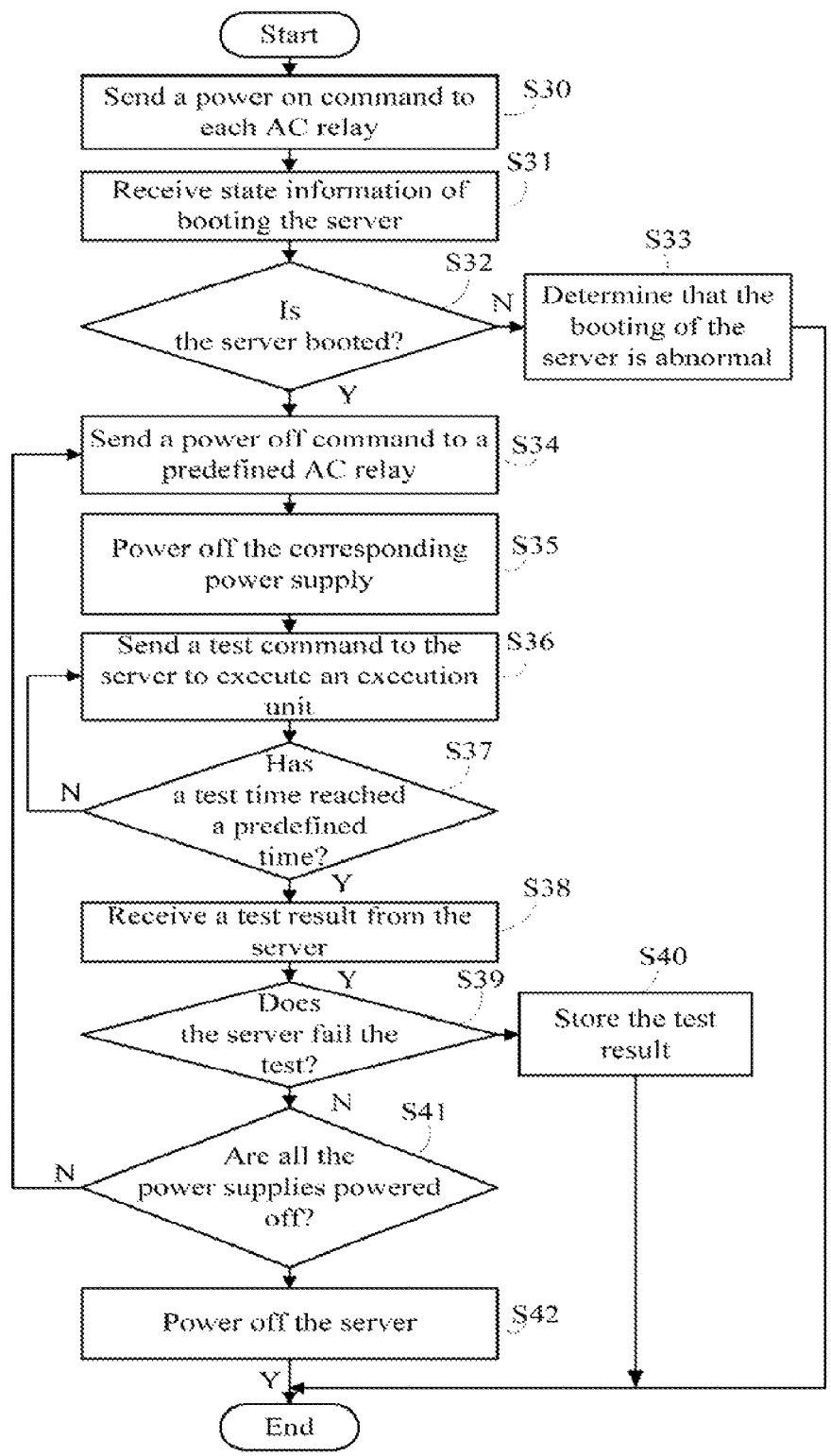
FIG. 3 is a flowchart illustrating one embodiment of a method for testing power supplies of a server.

FIG. 3 is a flowchart illustrating a method for testing power supplies of a server. Depending on the embodiment, additional blocks may be added, others removed, and the ordering of the blocks may be changed.

In block S30, the sending module 100 sends a power on command to each of the one or more AC relays 3 to power on a corresponding power supply 5.

In block S31, the receiving module 101 receives state information of booting the server 6.

In block S32, the detection module 102 detects if the server is booted according to the state information. If the server has not completed booting the server 6, block S33 is implemented. If the server is booted, block S34 is implemented.

In block S33, the determining module 103 determines that the booting of the server 6 is abnormal.

In block S34, the sending module 100 sends a power off command to a predefined AC relay 3.

In block S35, the predefined AC relay 3 switches off the corresponding power supply 5 according to the power off command.

In block S36, the sending module 100 sends a test command to the server 6 to execute the execution unit 60.

In block S37, the detection module 102 detects if the elapsed time of the test applied by the execution unit 60 has reached a predefined time. If the testing time has reached the predefined time, block S38 is implemented. If the testing time has not reached the predefined time, block S36 is repeated.

In block S38, the receiving module 101 receives a test result for determining if the server 6 works normally from the server 6.

In block S39, the detection module 102 detects if the server 6 has failed the test according to the test result. If the server 6 has failed the test, block S40 is implemented. If the server 6 has completely passed the test, block S41 is implemented.

In block S40, the determining module 103 stores the test result in the storage system 12.

In block S41, the detection module 102 detects if all the power supplies 5 are powered off. If there is any power supply 5 which is not powered off, block S34 is repeated. If all of the power supplies 5 are powered off in turn, block S42 is implemented.

In block S42, the sending module 100 powers off the server 6.

Although certain inventive embodiments of the present disclosure have been specifically described, the present disclosure is not to be construed as being limited thereto. Various changes or modifications may be made to the present disclosure beyond departing from the scope and spirit of the present disclosure.

What is claimed is:

1. A computing system, comprising:
   a storage system;
   at least one processor; and
   one or more programs being stored in the storage system and executable by the at least one processor, the one or more programs comprising:
   a sending module operable to send a power on command to one or more alternating current (AC) relays connected to the computing system, to power on a power supply of a server connected to each of the one or more AC relays, and send a power off command to a predefined power supply of the server if the server is booted;
   the sending module further operable to send a test command to the server to test the server that is powered by remaining power supplies which are not powered off;
   a detection module operable to detect whether a test time of testing the server has reached a predefined time;
   a receiving module operable to receive a test result from the server when the test time of testing the server has reached the predefined time, the test result according to a determination of whether the server works normally;
   the detection module further operable to detect whether the server fails the test according to the test result;
   the receiving module further operable to power off the server if all the power supplies are powered off and the server is determined as passing the test; and
   a determining module operable to store the test result in the storage system if the server fails the test.

2. The computing system as described in claim 1, wherein the receiving module is further operable to receive state information from the server according to a boot state of an operating system of the server, the boot state of the operating system being in a completed state or an uncompleted state.

3. The computing system as described in claim 2, further comprising:
   the determining module further operable to determine that the server is abnormal if the operating system is in the uncompleted state after all the power supplies are powered on.

4. The computing system as described in claim 3, wherein the detection module is further operable to detect if all the power supplies are powered off; and
   the sending module is further operable to send the power off command to each of the one or more AC relays connected to the remaining power supplies one by one until all the power supplies have been powered off.

5. A computer-based method for test power supplies of a server, comprising:
   sending a power on command to one or more alternating current (AC) relays connected to the test power supplies to power on all the power supplies of the server;
   sending a power off command to a predefined power supply of the server if the server is booted;
   sending a test command to the server to test the server that is powered by remaining power supplies which are not been powered off;
   detecting whether a test time of testing the server has reached a predefined time;
   receiving a test result from the server when the test time of testing the server has reached the predefined time, the test result according to a determination of whether the server working normally;
   detecting whether the server fails the test according to the test result;
   powering off the server if all the power supplies are powered off and the server is determined as passing the test; and
   storing the test result in a storage system of a computing system connected to the server if the server fails the test.

6. The method as described in claim 5, before block sending a power off command to a predefined power supply of the server if the server is booted further comprising:

receiving state information from the server according to a boot state of an operating system of the server, the boot state of the operating system being in a completed state or an uncompleted state;

detecting if the server is booted according to the state information if all the power supplies are powered on; and determining that the server is abnormal if operating system is in the uncompleted state after all the power supplies are powered on.

7. The method as described in claim 5, further comprising:

detecting if all the power supplies are powered off if the test is determined as success; and sending the power off command to each of the one or more AC relays connected to the remaining power supplies one by one until all the power supplies have been powered off.

8. A non-transitory storage medium having stored thereon instructions that, when executed by a processor, cause the processor to perform a method for test power supplies of a server, the method comprising:

sending a power on command to one or more alternating current (AC) relays connected to the test power supplies to power on all the power supplies of the server;

sending a power off command to a predefined power supply of the server if the server is booted;

sending a test command to the server to test the server that is powered by remaining power supplies which are not been powered off;

detecting whether a test time of testing the server has reached a predefined time;

receiving a test result from the server when the test time of testing the server has reached the predefined time, the test result according to a determination of whether the server working normally;

detecting whether the server fails the test according to the test result;

powering off the server if all the power supplies are powered off and the server is determined as passing the test; and storing the test result in a storage system of a computing system connected to the server if the server fails the test.

9. The non-transitory storage medium as described in claim 8, before block sending a power off command to a predefined power supply of the server if the server is booted further comprising:

receiving state information from the server according to a boot state of an operating system of the server, the boot state of the operating system being in a completed state or an uncompleted state;

detecting if the server is booted according to the state information if all the power supplies are powered on; and determining that the server is abnormal if operating system is in the uncompleted state after all the power supplies are powered on.

10. The non-transitory storage medium as described in claim 8, further comprising:

detecting if all the power supplies are powered off if the test is determined as success; and sending the power off command to each of the one or more AC relays connected to the remaining power supplies one by one until all the power supplies have been powered off.

* * * * *